US007411512B2

(12) United States Patent  
Domeier

(10) Patent No.: US 7,411,512 B2  
(45) Date of Patent: Aug. 12, 2008

(54) TRACKING THE GEOGRAPHIC LOCATION OF AN ANIMAL

(75) Inventor: Michael L. Domeier, 1612 Wilt Rd., Fallbrook, CA (US) 92028

(73) Assignee: Michael L. Domeier, Fallbrook, CA (US)

( * ) Notice: Subject to any disclaimer, the term of this patent is extended or adjusted under 35 U.S.C. 154(b) by 163 days.

(21) Appl. No.: 11/370,503

(22) Filed: Mar. 7, 2006

(65) Prior Publication Data

US 2007/0210927 A1   Sep. 13, 2007

(51) Int. Cl.
  G08B 23/00 (2006.01)
  G01S 3/02 (2006.01)
  G01V 3/00 (2006.01)
  G01C 17/34 (2006.01)
  G01C 9/00 (2006.01)
  G01C 21/00 (2006.01)

(52) U.S. Cl. .............................. 340/573.2; 340/539.13; 340/573.2; 340/988; 340/995.1; 342/419; 342/450; 342/357.01; 342/357.06; 342/357.14; 324/323; 324/244; 324/261; 33/268; 33/273; 33/275 R; 33/275 G; 33/281; 701/207; 701/213; 701/217; 701/224; 702/150; 702/151; 702/152; 702/153; 702/154

(58) Field of Classification Search ............ 340/539.13, 340/573.2, 988, 995.1; 342/357.01, 419–424, 342/450–457; 324/323, 244–261; 33/268–273, 33/275 R, 275 G, 281, 286; 701/200–217; 702/150–154

See application file for complete search history.

(56) References Cited

U.S. PATENT DOCUMENTS

| 215,403 | A | 5/1879 | Severn |
| 2,089,914 | A | 8/1937 | Freeman |
| 2,873,536 | A | 2/1959 | Rieger |
| 4,009,613 | A | 3/1977 | Jeter |
| 4,047,168 | A | 9/1977 | Fowler |
| RE29,526 | E | 1/1978 | Jeter |
| 4,092,779 | A | 6/1978 | Stokic |
| 4,117,602 | A | 10/1978 | Lapeyre |

(Continued)

OTHER PUBLICATIONS

Document entitled "Three-Dimensional Position Determination Based on Earths Geomagnetic Field (GSC-13880-1)." Public Release Date: Nov. 8, 2000. 3 Pages. Available at http://technology.nasa.gov/TOPS_Detail.cfm?PKEY=1000639&category=TOPS.

(Continued)

Primary Examiner—George A Bugg
Assistant Examiner—Lam P Pham
(74) Attorney, Agent, or Firm—Fish & Richardson P.C.

(57) ABSTRACT

Systems and techniques for tracking the geographic location. In one aspect, a method includes receiving timed magnetic field information descriptive of a magnetic field to which a magnetometer was subject, the magnetic field information having been collected while the magnetometer was associated with an animal, receiving timed longitude information descriptive of a longitude position of the animal, the longitude information having been collected while the magnetometer was associated with the animal, and matching the longitude information that is relevant to a first time to the magnetic field information that is relevant to the first time to determine a geographic location of the animal at the first time.

26 Claims, 6 Drawing Sheets

U.S. PATENT DOCUMENTS

| | | | |
|---|---|---|---|
| 4,324,297 | A | 4/1982 | Denison |
| 4,387,999 | A * | 6/1983 | Shelley .......................... 368/15 |
| 4,662,458 | A | 5/1987 | Ho |
| 4,779,353 | A | 10/1988 | Lopes et al. |
| 5,079,845 | A | 1/1992 | Childers |
| 5,194,859 | A | 3/1993 | Warren |
| 5,389,934 | A * | 2/1995 | Kass ..................... 342/357.07 |
| 5,421,420 | A | 6/1995 | Malone et al. |
| 5,469,630 | A | 11/1995 | Lewis |
| 5,553,661 | A * | 9/1996 | Beyerlein et al. ........... 165/203 |
| 5,777,580 | A * | 7/1998 | Janky et al. ................. 342/457 |
| 5,892,519 | A * | 4/1999 | Hirai .......................... 345/440 |
| 6,114,995 | A | 9/2000 | Ketchum |
| 6,398,155 | B1 * | 6/2002 | Hepner et al. .............. 244/3.15 |
| 6,417,500 | B1 * | 7/2002 | Wood ...................... 250/203.4 |
| 6,465,725 | B1 * | 10/2002 | Shibata et al. .............. 136/246 |
| 6,549,850 | B2 * | 4/2003 | Punkka et al. .............. 701/213 |
| 6,751,555 | B2 | 6/2004 | Poedjono |
| 6,847,324 | B1 * | 1/2005 | Honey et al. .................. 342/91 |
| 7,079,944 | B2 * | 7/2006 | Litchfield et al. ........... 701/207 |
| 7,300,367 | B1 | 11/2007 | Andol et al. |

OTHER PUBLICATIONS

Walker, Michael M. et al.; "The magnetic sense and its use in long-distance navigation by animals;" Current Opinion in Nuerobiology 2002, vol. 12, pp. 735-744.

"Dip Circle;" Wikipedia, the free encyclopedia; http://en.wikipedia.org/wiki/Dip_circle; last modified Nov. 5, 2004.

Sibert, John R. et al.; Reviews: Methods and Technologies in Fish Biology and Fisheries; "*Electronic Tagging and Tracking in Marine Fisheries;*" 2001 Kluwer Academic Publishers; v-xiii.

Sibert, John R.; Reviews: Methods and Technologies in Fish Biology and Fisheries; "*Electronic Tagging and Tracking in Marine Fisheries: Introduction to the Proceedings;*" 2001 Kluwer Academic Publishers, 1-6.

Arnold, Geoff et al.; Reviews: Methods and Technologies in Fish Biology and Fisheries; "*Electronic Tags in Marine Fisheries Research:* A 30-Year Perspective;" 2001 British Crown; 7-64.

Block, Barbara A. et al.; Reviews: Methods and Technologies in Fish Biology and Fisheries; "*Archival and Pop-Up Satellite Tagging of Atlantic Bluefin Tuna;*" 2001 Kluwer Academic Publishers, 65-88.

Boustany, Andre M. et al.; Reviews: Methods and Technologies in Fish Biology and Fisheries; "*Movements and Temperature Preferences of Atlantic Bluefin Tuna (Thunnus thynnus) off North Carolina: A Comparison of Acoustic, Archival and Pop-Up Satellite Tags*" 2001 Kluwer Academic Publishers, 89-108.

Gunn, John et al.; Reviews: Methods and Technologies in Fish Biology and Fisheries; "*The Relationship Between Food Intake and Visceral Warming in Southern Bluefin Tuna (Thunnus maccoyii):* Can we predict from archival tag data how much a tuna has eaten?;" 2001 Kluwer Academic Publishers, 109-130.

Ohta, Itaru et al.; Reviews: Methods and Technologies in Fish Biology and Fisheries; "*Aggregating Behavior of Yellowfin and Bigeye Tuna Tagged With Coded Ultrasonic Transmitters Around FADs in Okinawa, Japan;*" 2001 Kluwer Academic Publishers, 131-145.

O'Dor, Ron K. et al.; Reviews: Methods and Technologies in Fish Biology and Fisheries; "*Using Radio-Acoustic Positioning and Telemetry (RAPT) to Define and Assess Marine Protected Areas (MPAs);*" 2001 Kluwer Academic Publishers, 147-166.

Bolden, Stephania K.; Reviews: Methods and Technologies in Fish Biology and Fisheries; "*Using Ultrasonic Telemetry to Determine Home Range of a Coral-Reef Fish;*" 2001 Kluwer Academic Publishers, 167-188.

Eklund, Anne-Marie et al.; Reviews: Methods and Technologies in Fish Biology and Fisheries; "*A Stepwise Approach to Investigating the Movement Patterns and Habitat Utilization of Goliath Grouper, Epinephelus itajara, Using Conventional Tagging, Acoustic Telemetry and Satellite Tracking;*" 2001 Kluwer Academic Publishers, 189-216.

Heupel, M.R. et al.; Reviews: Methods and Technologies in Fish Biology anf Fisheries; "*Use of an Automated Acoustic Telemetry System to Passively Track Juvenile Blacktip Shark Movements;*" 2001 Kluwer Academic Publishers, 217-236.

Holland, Kim N. et al.; Reviews: Methods and Technologies in Fish Biology and Fisheries; "*Five Tags Applied to a Single Species in a Single Location: The Tiger Shark Experience;*" 2001 Kluwer Academic Publishers, 237-247.

Wetherbee, B.M. et al.; Reviews: Methods and Technologies in Fish Biology and Fisheries; "*Use of Telemetry in Fisheries Management: Juvenile Sandbar Sharks in Delaware Bay;*" 2001 Kluwer Academic Publishers, 249-262.

Buckley, Ainsley et al.; Reviews: Methods and Technologies in Fish Biology and Fisheries; *Orientation and Swimming Speed of Plaice Migrating by Selective Tidal Stream Transport: Preliminary Results from Acoustic Tracking and ADCP Measurements*; 2001 Kluwer Academic Publishers, 263-277.

Nakajima, Hiroshi et al.; Reviews: Methods and Technologies in Fish Biology and Fisheries; "*Notes About the Ecology of Ocellate Puffer, Takifugu rubripes, Using Archival Tags;*" 2001 Kluwer Academic Publishers, 279-287.

Meyer, Carl G. et al.; Reviews: Methods and Technologies in Fish Biology and Fisheries; "*A Kayak Method for Tracking fish in Very Shallow Habitats;*" 2001 Kluwer Academic Publishers, 289-296.

Webber, D.M. et al.; Reviews: Methods and Technologies in Fish Biology and Fisheries; "*Evaluating Differential Pressure in the European Sea Bass (Dicentrarchus labrax) as a Telemetered Index of Swimming Speed;*" 2001 Kluwer Academic Publishers, 297-313.

Hill, Roger D. et al.; Reviews: Methods and Technologies in Fish Biology and Fisheries; "*Geolocating by Light Level: The Next Step: Latitude;*" 2001 Kluwer Academic Publishers, 315-330.

Metcalfe, J.D.; Reviews: Methods and Technologies in Fish Biology and Fisheries; "*Summary Report of a Workshop on Daylight Measurements for Geolocation in Animal Telemetry;*" 2001 Kluwer Academic Publishers, 331-342.

Musyl, Michael K. et al.; Reviews: Methods and Technologies in Fish Biology and Fisheries; "*Ability of Archival Tags to Provide Estimates of Geographical Position Based on Light Intestiy;*" 2001 Kluwer Academic Publishers, 343-367.

Welch, David W. et al.; Reviews: Methods and Technologies in Fish Biology and Fisheries; "*Recent Progress in Estimating Geopositin Using Daylight;*" 2001 Kluwer Academic Publishers, 369-383.

Dagorn, Laurent et al.; Reviews: Methods and Technolgoies in Fish Biology and Fisheries; "*Improving our Understanding of Tropcial Tuna Movements from Small to Large Scales;*" 2001 Kluwer Academic Publishers, 385-405.

Kirby, David S.; Reviews: Methods and Technologies in Fish Biology and Fisheries; "*On the Integrated Study of tuna Behaviour and Spatial Dynamics: Tagging and Modelling as Complementary Tools;*" 2001 Kluwer Academic Publishers, 407-420.

Newlands, Nathaniel et al.; Reviews: Methods and Technologies in Fish Biology and Fisheries; "*From Individuals to Local Population Densities: Movements of North Atlantic Bluefin Tuna (Thunnus Thynnus) in the Gulf of Maine/Northwestern Atlantic;*" 2001 Kluwer Academic Publishers, 421-441.

Sibert, John et al.; Reviews: Methods and Technologies in Fish Biology and fisheries; "*Possible Models for Combining Tracking Data with Conventional Tagging Data;*" 2001 Kluwer Academic Publishers, 443-456.

Dewar, Heidi et al.; Environmental Bilogy of Fishers; "*Insights into young of the year white shark; Charcarodon charcarias, behavior in the Southern California Bight;*" 2004 Kluwer Academic Publishers; 70: 133-143.

Domeier, Michael L. et al.; Marine and Freshwater Research; "*Mortality rate of striped marlin (Tetrapturus audax) caught with recreational tackle;*" 2003 CSIRO Publishing; 54: 435-445.

Domeier, Michael L.; Marine Technology Society Journal; Commentary, "*Methods for the Deployment and Maintenance of an Acoustic Tag Tracking Array: An Example from California's Channel Islands;*" 2005 Pfleger Institute of Environmental Research; 39: 74-80.

Ekstrom, Phillip A.; Mem. Natl Inst. Polar Res.; Technical report, "*An advance in geolocation by light;*" 2004 National Institute of Polar Research; Spec. Issue; 58, 210-226.

Teo, Steven L. H. et al.; Marine Ecology progress Series; "*Validation of geolocation estimates based on light level and sea surface temperature from electronic tags;*" Inter-Research 2004, www.int-res.com; Published Nov. 30, vol. 283: 881-98.

Tremblay, Yann et al.; The Journal of Experimental Biology; "*Interpolation of animal tracking data in a fluid environment;*" The Company of Biologists 2006; 209: 128-140.

Welch, David W. et al.; Can. J. Fish. Aquat. Sci.; "*An assessment of light-based geoposition estimates from archival tags*" 1999 NRC Canada; 56: 1317-1327.

Shaffer, Scott A., et al.; Marine Biology; Research Article, "*Comparison of light- and SST-based geolocation with satellite telemetry in free-ranging albatrosses*" Springer-Verlag 2005; 147: 833-843.

Schaefer, Kurt M. et al.; Fishery Bulletin; "*Movements, behavior, and habitat selection of bigeye tuna (Thunnus obesus) in the eastern equatorial Pacific, ascertained through archival tag;*" 2002 Fish. Bull.; 100: 765-788.

Block, Barbara A. et al.; Nature; Letters to Nature, "*Electronic tagging and population structure of Atlantic bluefin tuna;*" Nature, www.nature.com/nature, Apr. 28, 2005; vol. 434: 1121-1127.

Domeier, Michael L. et al.; Fishery Bulletin; "*Tracking Pacific bluefin tuna (Thunnus thynnusorientalis) in the northeastern Pacific with an automated algorithm that estimates latitude by matching sea-surface-temperature data from satellites with temperature data from tags on fish;*" Fish. Bull 2005; 103: 292-306.

Sibert, John R. et al.; Fisheries Oceanography; "*Horizontal movements of bigeye tuna (Thunnus obesus) near Hawaii determined by Kalman filter analysis of archival tagging data;*" 2003 Blackwell Publishing Ltd.; 12(3): 141-151.

Gudbjornsson, Sigmar, et al.; " Mini GPS Fish Tags Contributing To Fisheries Management;; Reconstructing True Fish Distributions and Migration Routes Give New Insights into Fish Behavior;" *Sea Technology Magazine* [online]. Available from: www.sea-technology.com [Accessed May 10, 2006].

Star-Oddi Marine Device Manufacturing; "*DST Pitch & Roll Logger, Small submersible pitch and roll logger with temperature and depth measurements;*" [online] Available from: http://www.star-ddi.com/Temperature/Data_Storage_Tags/Pitch-Roll-logger/ [Accessed May 10, 2006].

Black, et al., U.S. Patent 4,731,870, Mar. 15, 1988; "*Platform transmitter terminal (PTT) for use with an ARGOS type satellite system and utilizing a solar array/rechargeable battery power source.*"

Lutcavage, Dr. Molly et al.; Microwave Telemetry, Inc.; "*Results for Pop-Up Satellite Tagging of Atlantic Bluefin Tuna Yield Surprises;*" [online] Available from: http://microwavetelemetry.com/Fish_PTTs/archival.php. [Accessed May 10, 2006].

Meyer, Mike et al.; Microwave Telemetry, Inc.; "*Initiating Pop-Up Satellite Tagging of White Sharks (Carcharadon archarias) in South Africa;*" [online] Available from: http://microwavetelemetry.com/Fish_PTTs/archival.php. [Accessed May 10, 2006].

Antoniou, Alex Ph.D. et al.; Microwave Telemetry, Inc.; "*Archival Pop-up Satellite Tagging of Whale Sharks (Rhincodon typus)in Honduras and the Galapagos Islands;*" [online] Available from: http://microwavetelemetry.com/Fish_PTTs/archival.php. [Accessed May 10, 2006].

Musyl, Mike et al.; Microwave Telemetry, Inc.; "*Archival Pop-Up Tag Studies of Pelagic Fishes and Sea Turtles in the Pacific Ocean: Treasure Trove of Data.*" [online] Available from: http://microwavetelemetry.com/Fish_PTTs/archival.php. [Accessed May 10, 2006].

Graves, John E. et al.; Microwave Telemetry, Inc.; "*Tracking the Fate and Habital Preferences of White Marlin Released from Commercial Fishing Gear with Archival Pop-Up Tags;*" [online]. Available from: http://microwavetelemetry.com/Fish_PTTs/archival.php. [Accessed May 10, 2006].

Microwave Telemetry, Inc.; "*PTT-100 Archival Pop-Up Tag,* Specifications" [online] . . . *PTT-100 Archival Pop-Up tag Specifications: Physical Specifications for Archival Pop-up Tag Transmitter.* [online] Available from: http://microwavetelemetry.com/Fish_PTTs/archival.php [Accessed May 10, 2006].

Microwave Telemetry, Inc.; "*PTT-100 High Rate Archival Pop-Up Tag.*" [online] Available from: http://microwavetelemetry.com/Fish_PTTs/archival.php. [Accessed May 10, 2006].

Wildlife Computers Innovative Tags for Innovative Research [online]; "*Is an Argos satellite tag right for your study?;*" [online] . . . "*Smart Position or Temperature Transmitting (SPOT5)Tag.*" [online] . . . "*Data-Collecting Argos Satellite (SPLASH) Tag;*" [online] Available from: http://www.wildlifecomputers.com/Satellite%20Tags/PAT.htm. [Accessed May 10, 2006].

Wildlife Computers Innovative Tags for Innovative Research; "*Archival Tags* [online];" . . . "Mk9 Archival Tag [online];" Available from: tags@wildlifecomputers.com and http://www.wildlifecomputers.com/Satellite%20Tags/PAT.htm. [Accessed May 10, 2006].

Wildlife Computers Innovative Tags for Innovative Research; "*Heartrate-Temperature Recorder (HTR), Heartrate Transmitter (HRX), and Stomach Temeprature Pill (STP);*" [online] Available from: http://www.wildlifecomputers.com/Satellite%20Tags/PAT.htm and tags@wildlifecomputers.com. [Accessed May 10, 2006].

Lotek Wireless; Fish & Wildlife Monitoring; "*The LTD 2000 Series Geolocation Tags: Introducing Lotek's new line of Geolocation Tags!*" [online]; Available from: http://www.lotek.com/ltd2000.htm. [Accessed May 10, 2006].

Lotek Wireless Inc.; "*Inferring the Surface Irradiance form Measurements Made at Depth;*" [online] Feb. 2, 2002; Available from: http://www.lotek.com/ltd2000.htm. [Accessed May 10, 2006].

Ekstrom, Phil; Lotek Wireless; "*An Advance In Geolocation By Light;*" [online] Available from: http://www.lotek.com/ltd2000.htm. [Accessed May 10, 2006].

Lotek Wireless; Fish & Wildlife Monitoring; "*The LTD_1100 Series: Economical time, temperature and depth recorders;*" [online]; . . . "Downloads, Software;" [online]; . . . "*LTD_1100 Series: Economical time, temperature and depth recorders;*" [online]; . . . "Avian LTD Products: Archival tags for bird research." [online]; Available from: http://www.lotek.com/ltd2000.htm. [Accessed May 10, 2006].

Lotek Wireless; Fish & Wildlife Monitoring; "*The MCFT Series: Coded Microprocessor Transmitters;*" [online]; . . . "MCFT Series: Features and Benefits;" [online]; . . . MCFT & MBFT Series: Coded & Pulsed Radio Transmitters; [online]; Available from: http://www.lotek.com/ltd2000.htm. [Accessed May 10, 2006].

Lotek Wireless; Fish & Wildlife Monitoring; "*The MBFT Series: Pulsed Microprocessor Transmitters;*" [online]; . . . "MBFT Series: Features and Benefits;" [online]; . . . "MCFT &MBFT Series: Coded & Pulsed Radio Transmitters;" [online]; Available from: http://www.lotek.com/ltd2000.htm. [Accessed May 10, 2006].

Lotek Wireless; Fish & Wildlife Monitoring; "*The EMG Series: Electromyogram Transmitters;*" [online]; . . . "EMG Series: Features and Benefits;" [online]; . . . "EMG: Electromyogram/Temeprature Transmitter;" [online] Available from: http://www.lotek.com/ltd2000.htm. [Accessed May 10, 2006].

Lotek Wireless; Fish & Wildlife Monitoring; "*The CAFT Series: Coded Acoustic Transmitters;*" [online]; . . . "CAFT Series: Features and Benefits;" [online]; . . . "The Cact Series; Coded Acoustic Fish Transmitters;" [online]; Available from: http://www.lotek.com/ltd2000.htm. [Accessed May 10, 2006].

Lotek Wireless; Fish & Wildlife Monitoring; Freshwater & Marine/Radio & Acoustic; "*The Cart Series: Combined Acoustic/Radio Transmitters;*" [online]; . . . "Cart Series: Features and Benefits;" [online]; Available from: http://www.lotek.com/ltd2000.htm. [Accessed May 10, 2006].

Lotek Wireless; Fish & Wildlife Monitoring; Freshwater & Marine/Radio & Acoustic; "*The Cart Series: Combined Acoustic/Radio Transmitters:* An invaluable tool for tracking speices that move between salt and fresh water or between shallow and deep fresh water environments;" [online]; Available from: http://www.lotek.com/ltd2000.htm. [Accessed May 10, 2006].

Lotek Wireless; Fish & Wildlife Monitoring; Freshwater & Marine/Radio & Acoustic; *LTD 2000 Series: Geolocator Archival Tags*: Introducing Lotek's new line of Geolocation tags! Designed principally as Geolocation tools, these tags are also highly effective Time, Temperature, Depth and Light Level recorders. Members of this new family include the 2300, 2310, 2350, 2400 and 2410; [online] Available from: http://www.lotek.com/ltd2000.htm. [Accessed May 10, 2006].

E-mail communication and attachment from Marco Flagg to Michael Domeier, Mar. 10, 2008. (3 pages).

"Application of Acoustic and Archival Tags to Assess Estuarine, Nearshore, and Offshore Habitat Utilization and Movement by Salmonids/Proceedings of a workshop held Sep. 10/11, 1996/Seattle, Washington" NOAA Technical Memorandum NOAA-TM-NMFS-SWFSC-236, George W. Boehlert, ed. (66 pages).

"Benchmark Tests of Accuracy of Two Archival Tags," by A.P. Klimley and C. Holloway, found on page 34 of "Application of Acoustic and Archival Tags to Assess Estuarine, Nearshore, and Offshore Habitat Utilization and Movement by Salmonids/Proceedings of a workshop held Sep. 10-11, 1996/Seattle, Washington" NOAA Technical Memorandum NOAA-TM-NMFS-SWFSC-236, George W. Boehlert, ed. (1 page).

"Optimizing Positional Accuracy of Archival Tags with Irradiance and Magnetic Sensors," by A.P. Klimley and W.J. Mangan, Proceedings of the 45th Annual Tuna Conference, Lake Arrowhead, California, May 23-24, 1994. (1 page).

"Report of the Study Group on OCean Salmon Tagging Experiments with Data Logging Tags/Aug. 1997," ICES Anadromous and Catadromous Fish Committee 1997. Study Group on Ocean Salmon Tagging Experiments with DATA Logging Tags. ICES CM 1997/M:3 (Printed from http://www.star-oddi.com on Dec. 24, 2006). (13 pages).

First two paragraphs of Section 8.2 of "Report of the Study Group on Ocean Salmon Tagging Experiments with Data Logging Tags/Aug. 1997,"ICES Anadromous and Catadromous Fish Committee 1997. Study Group on Ocean Salmon Tagging Experiments with Data Logging Tags. ICES CM 1997/M:3 (*Printed from http://www.star-oddi.com* on Dec. 24, 2006). (1 page).

"Program Summary," U.S. Geological Survey (USGS) National Geomagnetism Program (*Printed from* http://geomag.usgs.gov/about.php on Mar. 12, 2008). (8 pages).

"Operations," U.S. Geological Survey (USGS) National Geomagnetism Program (Printed from http://geomag.usgs.gov/operations.php on Mar. 12, 2008). (10 pages).

"Data," U.S. Geological Survey (USGS) National Geomagnetism Program (Pritned from http://geomag.usgs.gov/observatories/data/ on Mar. 12, 2008). (3 pages).

"Real-Time Geomagnetic Data - Test," U.S. Geological Survey (USGS) National Geomagnetism Program (*Printed from* http://geomag.usgs.gov/observatories/data/realtime/ on Mar. 12, 2008). (4 pages).

"Definitive Data," U.S. Geological Survey (USGS) National Geomagnetism Program (*Printed from* http://geomag.usgs.gov/observatories/data/definitive/ on Mar. 12, 2008). (2 pages).

"Models," U.S. Geological Survey (USGS) National Geomagnetism Program (*Printed from* http://geomag.usgs.gov/models/ on Mar. 12, 2008). (5 pages).

"Charts," U.S. Geological Survey (USGS) National Geomagnetism Program (*Printed from* http://geomag.usgs.gov/charts/ on Mar. 12, 2008). (4 pages).

\* cited by examiner

TRACKING THE GEOGRAPHIC LOCATION OF AN ANIMAL

BACKGROUND

This disclosure relates to tracking the geographic location of wildlife and the like.

Geographic location is generally described in terms of longitude and latitude. Longitude is the angular distance of a location east or west of the Prime Meridian. Latitude is the angular distance of a place north or south of the Equator. Geographic location can also be described in other units Wildlife, domesticated animals, and even humans often travel distances that are on the geographic scale. Tracking such travel is relevant to a number of issues, including migration, breeding, the spread of disease, and life activities.

SUMMARY

Systems and techniques for tracking geographic location are disclosed. In one aspect, a method includes receiving timed magnetic field information descriptive of a magnetic field to which a magnetometer was subject, the magnetic field information having been collected while the magnetometer was associated with an animal, receiving timed longitude information descriptive of a longitude of the animal, the longitude information having been collected while the magnetometer was associated with the animal, and matching the longitude information that is relevant to a first time to the magnetic field information that is relevant to the first time to determine a geographic location of the animal at the first time.

This and other aspects can include one or more of the following features. The method can include associating a tracking device that includes the magnetometer with the animal. Alignment information descriptive of an alignment of the magnetometer can be received. The alignment information can have been collected while the magnetometer was associated with the animal. The magnetic field information can be corrected to account for the alignment of the magnetometer using the alignment information. The magnetic field information can include information descriptive of a direction of the magnetic field. The longitude information can be matched to the magnetic field information by comparing the information descriptive of the magnitude of the magnetic field with information describing an inclination of the earth's magnetic field.

The magnetic field information can include information descriptive of a magnitude of the magnetic field The longitude information can be matched to the magnetic field information by comparing the information descriptive of the magnitude of the magnetic field with information describing a magnitude of the earth's magnetic field. The magnetic field information and the longitude information can be received directly from the data output of a tracking device. The longitude information can be information descriptive of the illumination of the animal. The determined geographic location can be received from the data output of a tracking device.

1. In another aspect, a tracking device includes a magnetometer to generate an output descriptive of a magnetic field to which the tracking device is subject at collection of different times, a longitude sensor to generate an output descriptive of a longitude of the tracking device at collection of different times, and a data store to store one or more of a) the descriptions output by the magnetometer and the longitude sensor and b) a description of the geographic position of the tracking device. One or more of the description output by the magnetometer, the description output by the longitude sensor, and the description of the geographic position of the tracking device is timed so that a time to which the description is relevant can be determined. At least some of the description output by the magnetometer and at least some of the description output by the longitude sensor are relevant to a same first time. The description of the geographic position can be determined based at least in part on the descriptions output by the magnetometer and the longitude sensor.

This and other aspects can include one or more of the following features. The tracking device can include an environmental enclosure encasing the magnetometer, the longitude sensor, and the data store to form a mechanical barrier between the encased components and the outside environment. The tracking device can include an alignment sensor to generate an output descriptive of an alignment of the magnetometer relative to gravity and/or an alignment member to align the magnetometer relative to gravity. The magnetometer can be an inclination compass and/or a vector magnetometer. The magnetometer can include a collection of components that are sensitive to the magnetic field to which the tracking device is subject and are aligned in different directions relative to each another. The magnetometer can include a magneto-inductive sensor magnetometer. The longitude sensor can include a photodetector. The tracking device can also include a processor to determine a description of the geographic position based on the descriptions output by the magnetometer and the longitude sensor and/or an attachment member to attach the tracking device to an animal.

In another aspect, a tracking device includes a first means for generating an output descriptive of a magnetic field to which the tracking device is subject at collection of different times; a second means for generating an output descriptive of a longitude of the tracking device at collection of different times; and a means for outputting from the tracking device one or more of a) information descriptive of the outputs descriptive of the magnetic field and the longitude and b) a description of the geographic position of the tracking device. The description of the geographic position can be determined based at least in part on the outputs descriptive of the magnetic field and the longitude. One or more of the output descriptive of the magnetic field, the output descriptive of the longitude, and the description of the geographic position of the tracking device is timed. At least some of the output descriptive of the magnetic field and at least some of the output descriptive of the longitude are relevant to a same first time.

The details of one or more implementations are set forth in the accompanying drawings and the description below. Other features and advantages will be apparent from the description and drawings, and from the claims.

DESCRIPTION OF DRAWINGS

FIGS. 8-11 are flowcharts of processes for tracking the geographic location of wildlife and the like.

Like reference symbols in the various drawings indicate like elements.

DETAILED DESCRIPTION

Figure 1:
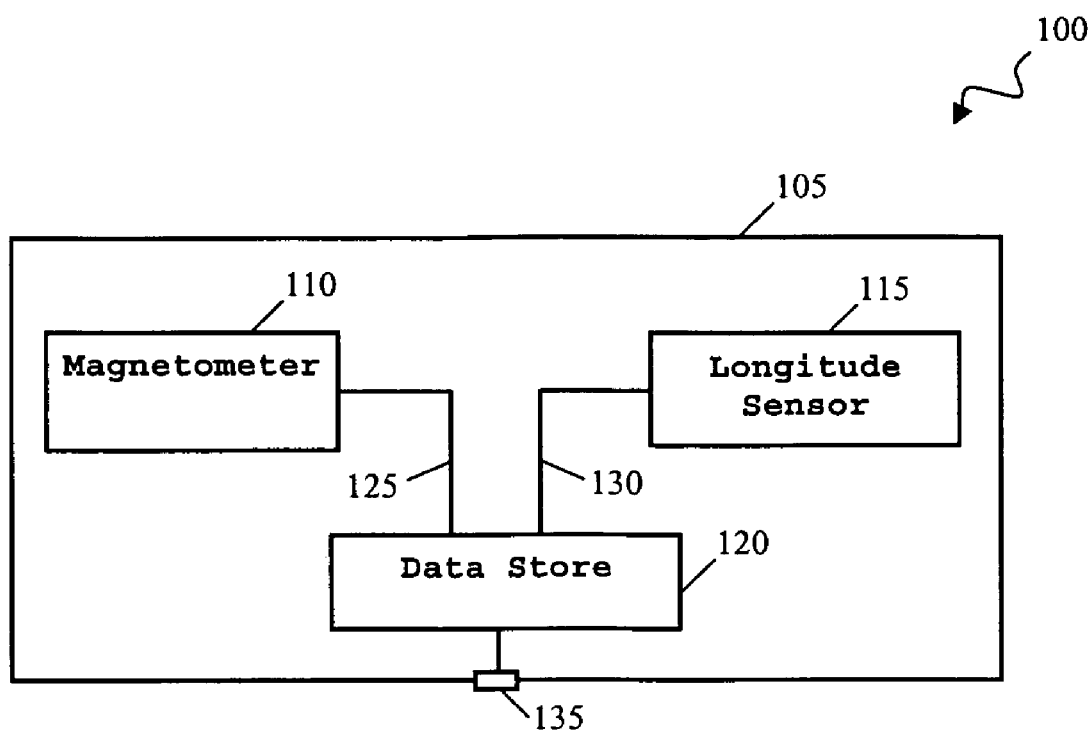
FIG. 1 is a schematic diagram of a tracking device.

FIG. 1 is a schematic diagram of a tracking device 100 for tracking wildlife and the like. Tracking device 100 includes an environmental enclosure 105 that defines an interior in which a magnetometer 110, a longitude sensor 115, and a data store 120 are encased. Tracking device 100 can be surgically implanted or otherwise associated with a tracked animal so as to follow the geographic movement of the animal. For example, tracking device 100 can be attached directly to an animal.

Tracking device 100 can be dimensioned so as not to impair the mobility of a tracked animal. For example, the weight of tracking device 100 can be less than the weight of a tracked animal, such as a fraction of the animal's weight. The length and width of tracking device 100 can be selected so as to not awkwardly hinder the movement of a tracked animal. The shape of environmental enclosure 105 can also be appropriately dimensioned. For example, when tracking device 100 is to be used to track fish or other water-dwelling animals, tracking device 100 can be streamlined to reduce the drag.

Environmental enclosure 105 forms a mechanical barrier between the encased components and the outside environment that is sufficient to protect the encased components from adverse effects of exposure to the outside environment. For example, environmental enclosure 105 can be hermetically sealed and mechanically robust to protect the encased components from the water and mechanical insult that are likely to be encountered during the tracking. Environmental enclosure 105 can be permanently sealed or environmental enclosure 105 can include one or more access mechanisms that provide access to the encased components as desired. The access mechanism can allow reversible access (such as, e.g., a replaceable panel or re-sealable plug) or irreversible access (such as, e.g., a metal, ceramic, or polymeric barrier that can be cut or fractured).

Magnetometer 110 is a device that measures a parameter of the magnetic field to which tracking device 100 is subject. In some implementations, magnetometer 110 can be a vector magnetometer and determine the magnetic field direction. In some implementations, magnetometer 110 can determine the magnetic field magnitude. As discussed further below, in some implementations magnetometer 110 can be used as an inclination compass (also known as an "inclinometer" or a "dip circle") to provide latitude information. In some implementations, magnetometer 110 can determine the magnitude of the magnetic field to which tracking device 100 is subject and/or provide information about local magnetic field effects. Magnetometer 110 is dimensioned to fit within enclosure 105. Magnetometer 110 can output information that describes the magnetic field to which tracking device 100 is subject over a data link 125. Data link 125 can be, e.g., a wire, a bus, an optical fiber, another information-carrying medium, or combinations thereof.

Longitude sensor 115 is a device that senses a parameter indicative of the geographic longitude of tracking device 100. For example, in some implementations, longitude sensor 115 is a photodetector (such as, e.g., a photodiode, a photoresistor, and/or a photovoltaic device) that senses the timing, amount, and/or direction of illumination received by tracking device 100. Longitude sensor 115 is dimensioned to fit within enclosure 105. Longitude sensor 115 can output information that describes the parameter indicative of the geographic longitude of tracking device 100 over a data link 130. The output longitude information can be raw measurement data (such as a time sequence of illumination) or the output information can be processed data (such as a longitude computed based on the time sequence of illumination and the expected illumination at different geographic longitudes). Data link 130 can be, e.g., a wire, a bus, an optical fiber, another information-carrying medium, or combinations thereof. In some implementations, data links 125, 130 share the same physical medium.

Data store 120 is a memory device capable of receiving and storing information received from magnetometer 110 and longitude sensor 115 over data links 125, 130. Data store 120 can be any of a number of different writeable memory types and can be implemented as a chip, a card, a disc, or other memory device. Data store 120 is dimensioned to fit within enclosure 105. Data links 125, 130 can carry information directly from magnetometer 110 and longitude sensor 115 to data store 120 (i.e., without intermediary) or data links 125, 130 can carry information indirectly from magnetometer 110 and longitude sensor 115 to data store 120 (i.e., over one or more intermediary devices).

Data store 120 also includes a data output 135 through which stored information can be retrieved from data store 120. For example, data output 135 can be data output port. Data output 135 can traverse environmental enclosure 105 (as shown) or data output 135 can be encased in the interior defined by environmental enclosure 105. Data output 135 can be accessed when the interior of environmental enclosure 105 is accessed or from the exterior of environmental enclosure 105. For example, data output 135 can include a transmitter that can transmit data to a remote receiver.

Figure 2:
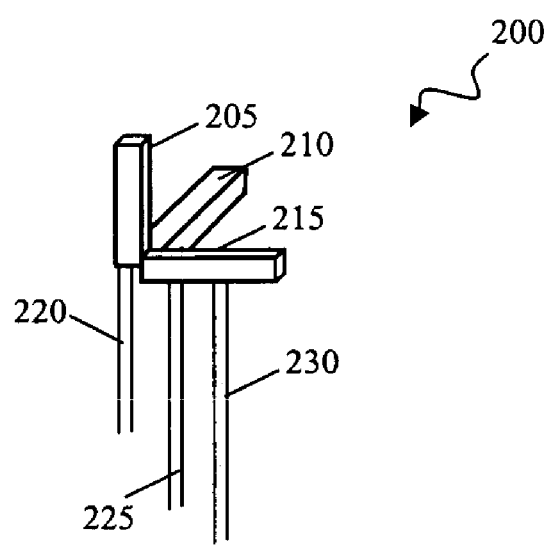
FIG. 2 shows one implementation of a sensing component of magnetometer.

FIG. 2 shows one implementation of a sensing component of magnetometer 110, namely, a magneto-inductive sensor magnetometer 200. Magnetometer 200 includes a collection of magneto-inductive sensors that are aligned in different directions to sense different components of the magnetic field. For example, a collection of three magneto-inductive sensors 205, 210, 215 can be held in a fixed orthogonal relationship to one another. The inductances of magneto-inductive sensors 205, 210, 215 change as the direction and magnitude of the magnetic field changes. Such changes in inductance can be detected, e.g., in an oscillator circuit and used to quantify the corresponding changes in magnetic field. Magneto-inductive sensors 205, 210, 215 can be housed in microelectronic packaging, such as a dual in-line package (DIP). For example, magneto-inductive sensors 205, 210, 215 can be the PNI SEN-S Magneto-Inductive Sensor (PNI Corporation, Santa Rosa, Calif.)

Magneto-inductive sensors 205, 210, 215 each include a respective output 220, 225, 230 over which a description of a parameter of the magnetic field can be output. The description provided by outputs 220, 225, 230 can be, e.g., electrical contact to inductive components in magneto-inductive sensors 205, 210, 215, raw data (such as the results of induction measurements), and/or processed data (such as magnetic field magnitude and/or direction information).

Other categories of sensing components, including those based on other principles of detection, can be used in magnetometer 110. For example, sensing components that use fluxgates or magneto-resistive technologies can also be used.

Figure 3:
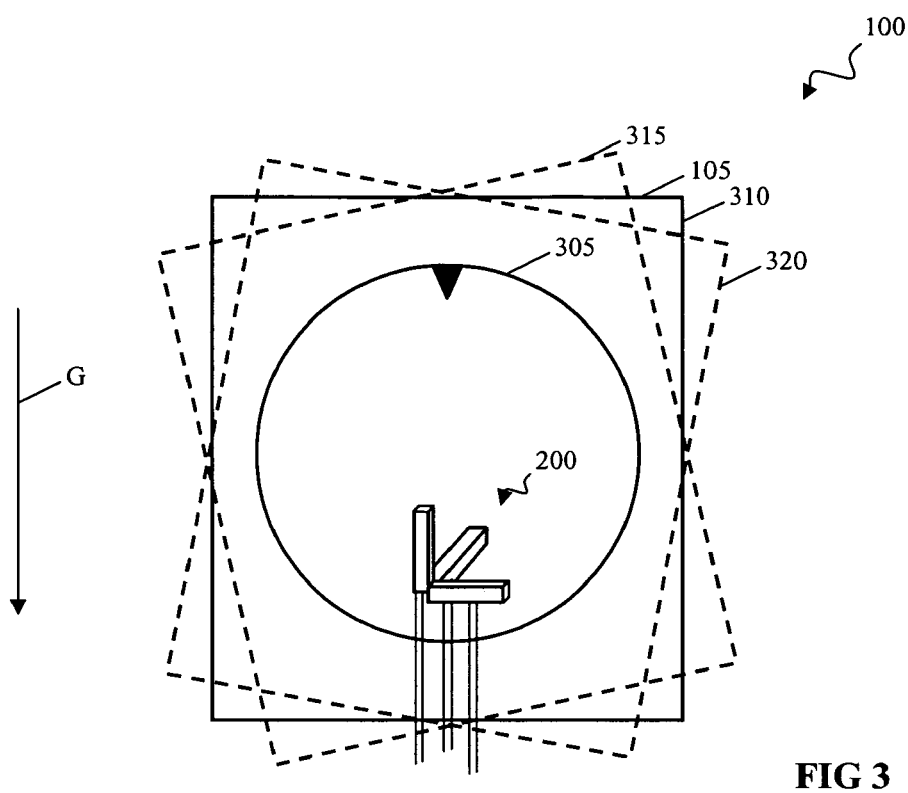
FIG. 3 shows one mounting of the sensing component of FIG. 2 in a tracking device.

FIG. 3 shows one mounting of magneto-inductive sensor magnetometer 200 in tracking device 100. In particular, magneto-inductive sensor magnetometer 200 can be mounted to an alignment member 305 in magnetometer 110. Alignment member 305 maintains magneto-inductive sensor magnetometer 200 in a known vertical relationship with the direction of the force of gravity G. Thus, as environmental enclosure 105 moves from a first position 310 to either a second position 315 or a third position 320, the vertical alignment of magneto-inductive sensor magnetometer 200 remains substantially fixed. Alignment member 305 can be, e.g., a hollow sphere half-filled with liquid, a gimbal, a gyroscope, or other alignment member. Please note that the vertical alignment provided by alignment member 305 need not be very precise. Geographic-scale movement by tracked animals is generally rather slow and ample opportunities for data averaging and the like exist.

Figure 4:
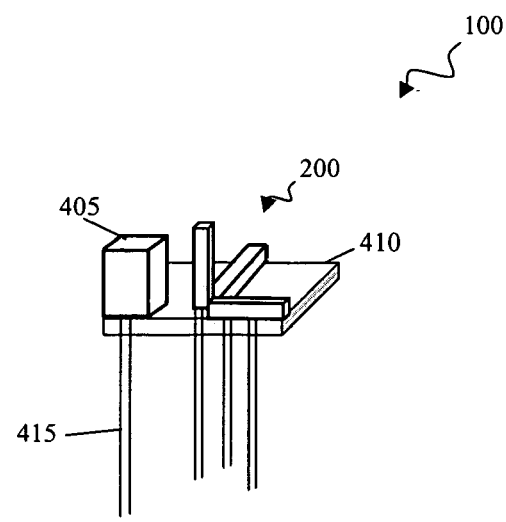
FIG. 4 shows another mounting of the sensing component of FIG. 2.

FIG. 4 shows another mounting of magneto-inductive sensor magnetometer 200. In particular, magneto-inductive sensor magnetometer 200 can be mounted in a known relationship to an alignment sensor 405 using a member 410. Alignment sensor 405 can detect the direction of the force of gravity. Alignment sensor 405 includes an output 415 over which a description of the direction of the force of gravity can be output. For example, alignment sensor 405 can be a bubble level, an accelerometer, or other device.

Figure 5:
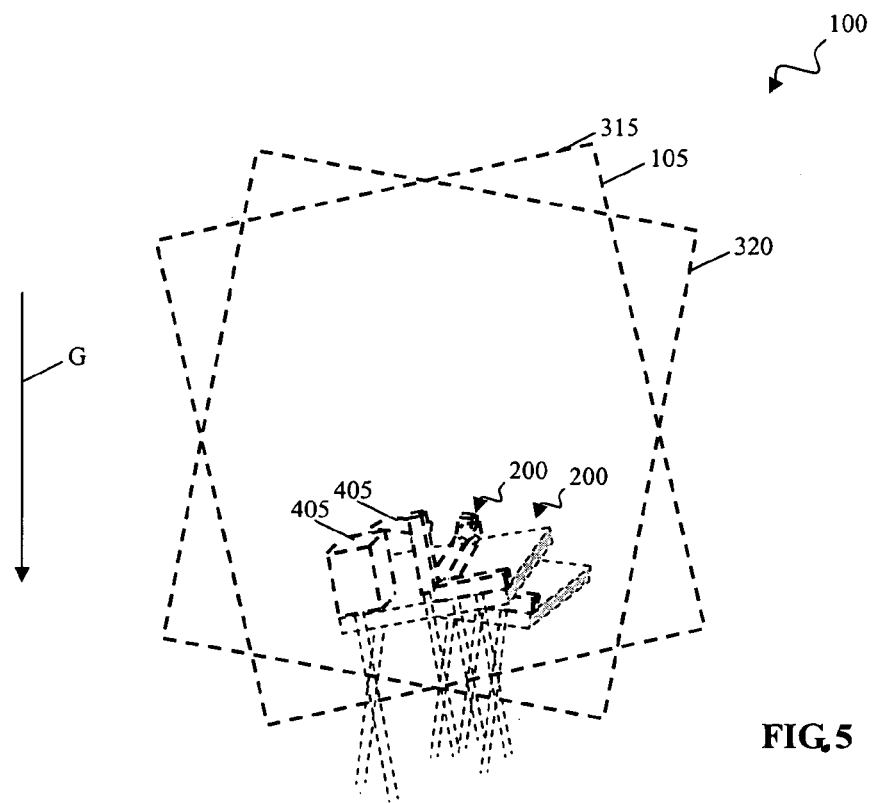
FIG. 5 shows the consequence of movement on the sensing component mounting of FIG. 4.

With magneto-inductive sensor magnetometer 200 mounted in a known relationship to an alignment sensor 405, the description output by outputs 220, 225, 230 of magnetometer 200 can be corrected using the description output by sensor 405 on output 415. This can allow for more robust mechanical connection of magnetometer 200 to enclosure 105. For example, as shown in FIG. 5, magnetometer 200 and sensor 405 can be connected to enclosure 105 so that, as enclosure 105 moves between positions 315, 320, magnetometer 200 and sensor 405 also change position relative to the direction of the force of gravity G. The corrected output of magneto-inductive sensor magnetometer 200 can be stored in data store 120.

Figure 6:
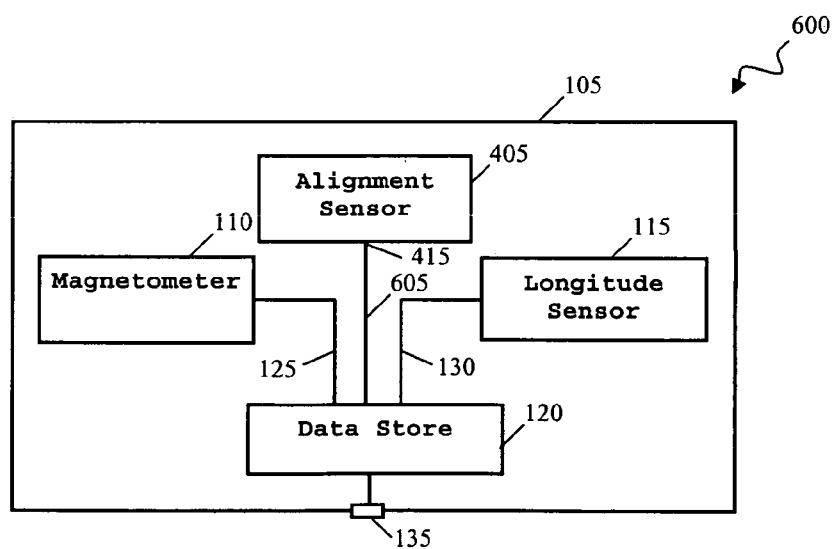
FIGS. 6-7 are schematic diagrams of other implementations of a tracking device.

FIG. 6 is a schematic diagram of another implementation of a tracking device 600 that includes alignment sensor 405 in a fixed mechanical relationship with magnetometer 200. Tracking device 600 includes environmental enclosure 105, magnetometer 110, longitude sensor 115, data store 120, and data output 135, in addition to alignment sensor 405. Tracking device 600 additionally includes a data link 605 between output 415 of alignment sensor 405 and data store 120. When alignment sensor 405 outputs a description of the direction of the force of gravity on output 415, data link 605 can convey the description to data store 120 where it can be stored in association with corresponding descriptions of the magnetic field to which tracking device 600 has been subject and the parameter indicative of the geographic longitude provided by longitude sensor 115. Data link 605 can be, e.g., a wire, a bus, an optical fiber, or another information-carrying medium, or combinations thereof. In some implementations, data links 125, 130, 605 share the same physical medium.

Figure 7:
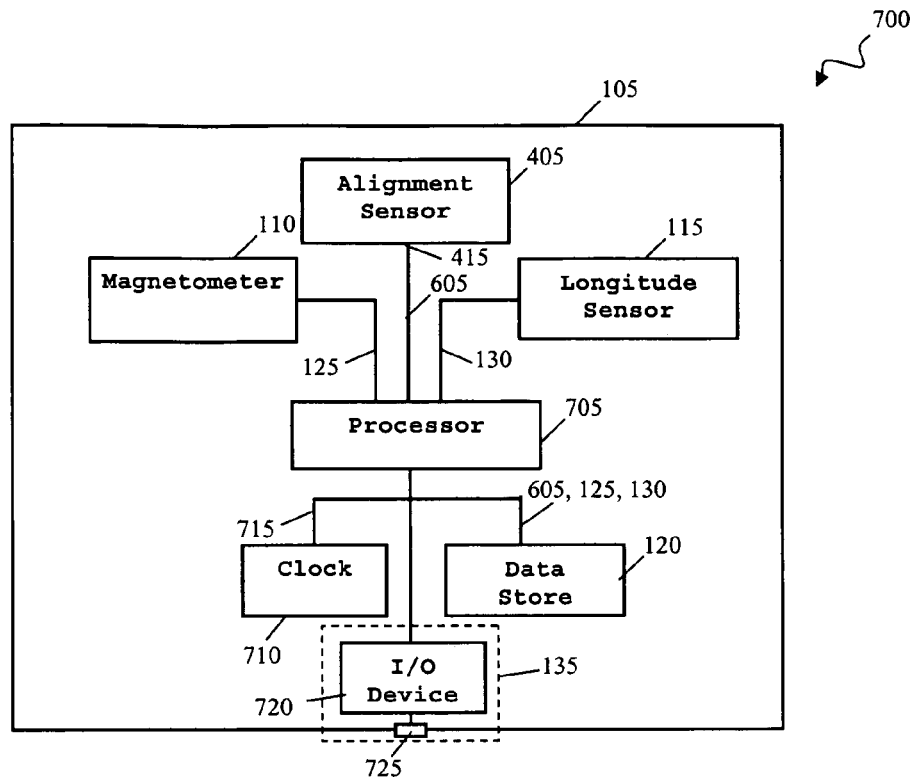

FIG. 7 is a schematic diagram of another implementation of a tracking device 700 that includes alignment sensor 405 in a fixed mechanical relationship with magnetometer 200. Tracking device 700 includes environmental enclosure 105, magnetometer 110, longitude sensor 115, data store 120, data output 135, and alignment sensor 405. Tracking device 700 additionally includes a processor 705 and a clock 710.

Processor 705 is an analog or a digital signal or data processing device and/or software that performs processing activities in accordance with set of processing logic. The processing logic can be set forth in an arrangement of hardware, a set of machine readable instructions, and/or combinations thereof. Instructions and/or data for the processing activities can be stored in hardware and/or software. For example, instructions and data can be stored in data store 120.

Processor 705 can thus perform amplification, filtering, averaging, matching, computation, or other activities. For example, in some implementations, processor 705 can correct a description of a magnetic field direction output by magnetometer 110 with a description of the direction of the force of gravity output by alignment sensor 405 to account for the orientation of tracking device 700. As another example, in some implementations, processor 705 can average successive description information over periods of hours or even days to decrease the noise level associated with the information. As another example, processor 705 can match descriptions of one or more magnetic parameters output by magnetometer to geomagnetic maps, databases, or other information to determine a geographic location, as discussed further below.

Clock 710 is a device for indicating time. Clock 710 can output an absolute or a relative indication of time over a data link 715. The time information on data link 715 can be received by data store 120 and/or processor 705. For example, the time information on data link 715 can be used to generate a time stamp for description information stored in data store 120. In some implementations, clock 710 can be internal to processor 705, such as when processor 705 is a digital data processor.

In the illustrated implementation, data output 135 includes an I/O device 720 and a data port 725. I/O device 720 is a device suitable not only for conveying information gathered by tracking device 700 to the outside world, but also for receiving information to be used by tracking device 700 during data gathering. For example, I/O device 720 can be suitable for conveying or changing instructions and/or data stored at data store 120, changing the logic by which processor 700 performs processing activities, and/or resetting clock 720. I/O device 720 can carry information electrically, mechanically, and/or optically.

Figure 8:
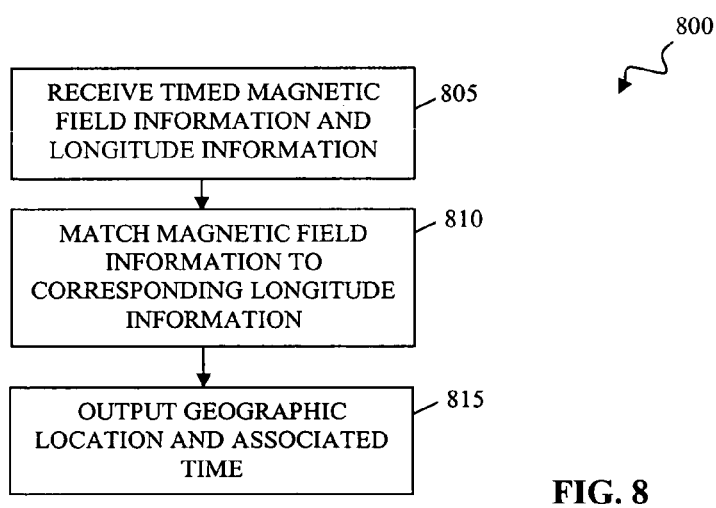

FIG. 8 is a flowchart of a process 800 for tracking the geographic location of wildlife and the like. Process 800 can be performed in whole or in part by a tracking device such as devices 100 (FIG. 1), 600 (FIG. 6), 700 (FIG. 7). For example, process 800 can be performed by a data processor that receives information over data output 135 from one or more tracking devices 100, 600, 700. As another example, process 800 can be performed by a processor 705 that is internal to one or more tracking devices 100, 600, 700 and the results of process 800 can be stored in data store 120.

The system that performs process 800 receives timed magnetic field information and longitude information at 805. The received information is timed in that the time to which the information is relevant can be determined. For example, such a time can be determined based on the order in which the information is received or based on a time stamp associated with the information. The magnetic field information and longitude information can have been filtered, processed, averaged, or otherwise prepared prior to receipt. The received information can relate to one or more parameters of the magnetic field to which the tracking device has been subject. These parameters can include, e.g., magnetic field direction (including, e.g., inclination and/or declination) and/or magnetic field intensity (including, e.g., total intensity, horizontal intensity, and/or vertical intensity). The received information need not identify a magnetic field parameter, but rather only need provide sufficient description such the one or more magnetic field parameters can be determined.

The system that performs process 800 can match the received magnetic field information to corresponding longitude information at 805. Magnetic field information corresponds to longitude information when both are associated with the same or a related period of time.

Magnetic field information can be matched to longitude information in a variety of ways. For example, in one implementation, the longitude, or approximate longitude, of a tracked animal at a first time can be determined from longitude information associated with that time. A parameter of the magnetic field at that time (or at a related time) can be compared with maps, databases, or other information describing the earth's magnetic field. For example, a parameter of the magnetic field can be compared with geomagnetic databases such as those distributed by the United States Geological Service (USGS). The USGS databases include inclination, declination, total intensity, horizontal intensity, and vertical intensity information. Geographic position(s) that have the proper longitude and magnetic field parameter can be identified. By repeatedly identifying such positions for different times, any measurement inaccuracies and/or imprecisions can be reduced and a track of the geographic position of a tracked animal can be determined.

After the magnetic field information is matched to longitude information, the system that performs process 800 can output a collection of geographic locations and associated times at 815. The output of geographic locations can be in latitude and longitude or in other units. Such a collection is a track of the geographic location of an animal.

Figure 9:
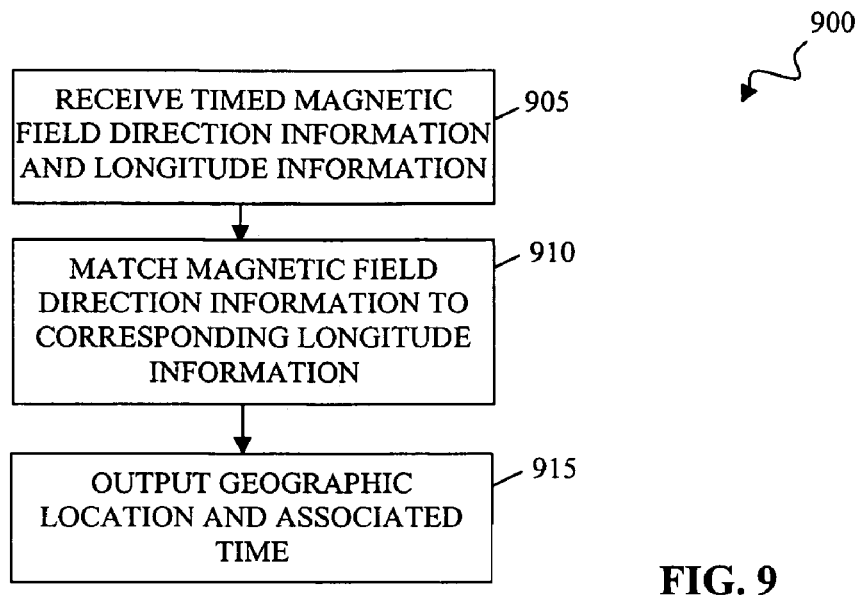

FIG. 9 is a flowchart of a process 900 for tracking the geographic location of wildlife and the like. Process 900 can be performed in whole or in part by a tracking device such as devices 100 (FIG. 1), 600 (FIG. 6), 700 (FIG. 7). For example, process 900 can be performed by a data processor that receives information over data output 135 from one or more tracking devices 100, 600, 700. As another example, process 900 can be performed by a processor 705 that is internal to one or more tracking devices 100, 600, 700 and the results of process 900 can be stored in data store 120.

The system that performs process 900 receives timed magnetic field direction information and longitude information at 905. The received information is timed in that the time to which the information is relevant can be determined. For example, such a time can be determined based on the order in which the information is received or based on a time stamp associated with the information.

The magnetic field direction information and longitude information can have been filtered, processed, averaged, or otherwise prepared prior to receipt. The received information need not identify the magnetic field direction and longitude directly, but rather only need provide sufficient description such the magnetic field direction and longitude can be determined.

The system that performs process 900 can match the received magnetic field direction information to corresponding longitude information at 905. Magnetic field direction information corresponds to longitude information when both are associated with the same or a related period of time.

Magnetic field direction information can be matched to longitude information in a variety of ways. For example, in one implementation, the longitude, or approximate longitude, of a tracked animal at a first time can be determined from longitude information associated with that time. The direction of the magnetic field at that time (or at a related time) can be compared with maps, databases, or other information describing the earth's magnetic inclination. Geographic position(s) that have the proper longitude and inclination can be identified. By repeatedly identifying such positions for different times, any measurement inaccuracies and/or imprecisions can be reduced and a track of the geographic position of a tracked animal can be determined.

After the magnetic field direction information is matched to longitude information, the system that performs process 900 can output a collection of geographic locations and associated times at 915. The output of geographic locations can be in latitude and longitude or in other units. Such a collection is a track of the geographic location of an animal.

Figure 10:
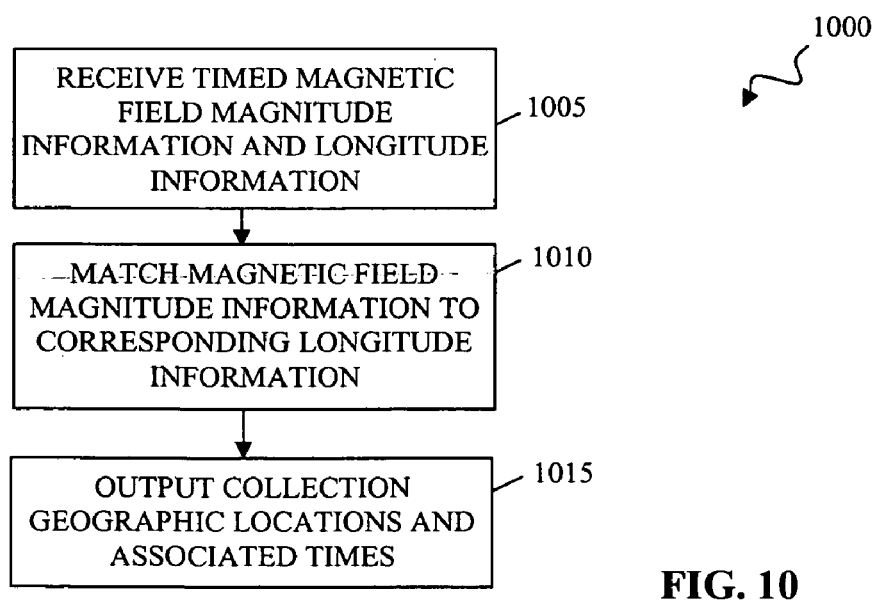

FIG. 10 is a flowchart of a process 1000 for tracking the geographic location of wildlife and the like. Process 1000 can be performed in whole or in part by a tracking device such as devices 100 (FIG. 1), 600 (FIG. 6), 700 (FIG. 7).

The system that performs process 1000 receives timed magnetic field magnitude information and longitude information at 1005. The magnetic field magnitude information and longitude information can have been filtered, processed, averaged, or otherwise prepared prior to receipt. The received information need not identify the magnetic field magnitude and longitude directly, but rather only need provide sufficient description such the magnetic field magnitude and longitude can be determined.

The system that performs process 1000 can match the received magnetic field magnitude information to corresponding longitude information at 1005. Magnetic field magnitude information corresponds to longitude information when both are associated with the same or a related period of time.

Magnetic field magnitude information can be matched to longitude information in a variety of ways. For example, in one implementation, the longitude, or approximate longitude, of a tracked animal at a first time can be determined from longitude information associated with that time. The magnitude of the magnetic field at that time (or at a related time) can be compared with maps, databases, or other information describing the magnitude of the earth's magnetic field. Geographic position(s) that have the proper longitude and magnetic field magnitude can be identified. By repeatedly identifying such positions for different times, any measurement inaccuracies and/or imprecisions can be reduced and a track of the geographic position of a tracked animal can be determined.

After the magnetic field magnitude information is matched to longitude information, the system that performs process 1000 can output a collection of geographic locations and associated times at 1015.

Figure 11:
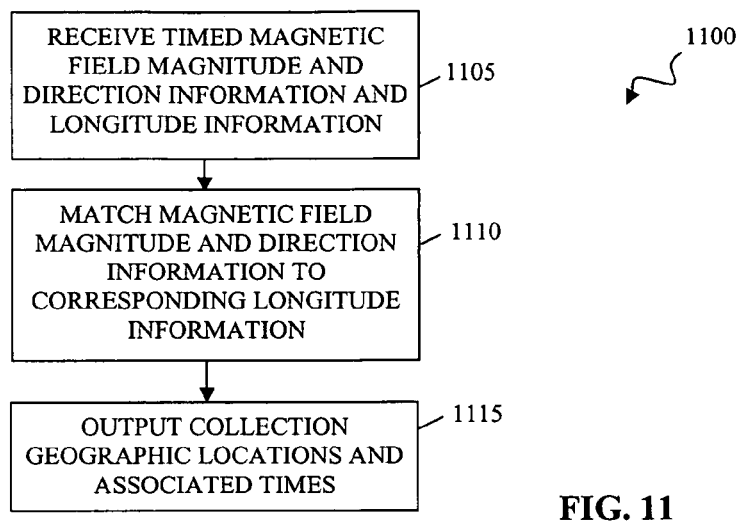

FIG. 11 is a flowchart of a process 1100 for tracking the geographic location of wildlife and the like. Process 1100 can be performed in whole or in part by a tracking device such as devices 100 (FIG. 1), 600 (FIG. 6), 700 (FIG. 7).

The system that performs process 1100 receives timed magnetic field magnitude and direction information and longitude information at 1105. The magnetic field magnitude and direction information and longitude information can have been filtered, processed, averaged, or otherwise prepared prior to receipt. The received information need not identify the magnetic field magnitude and direction and the longitude directly, but rather only need provide sufficient description such the magnetic field magnitude and direction and longitude can be determined.

The system that performs process 1100 can match the received magnetic field magnitude and direction information to corresponding longitude information at 1105. Magnetic field magnitude and direction information corresponds to longitude information when both are associated with the same or a related period of time.

Magnetic field magnitude and direction information can be matched to longitude information in a variety of ways. For example, in one implementation, the longitude, or approximate longitude, of a tracked animal at a first time can be determined from longitude information associated with that time. The magnitude and direction of the magnetic field at that time (or at a related time) can be compared with maps, databases, or other information describing the magnitude and direction of the earth's magnetic field. Geographic position(s) that have the proper longitude and magnetic field magnitude and direction can be identified. By repeatedly identifying such positions for different times, any measurement inaccuracies and/or imprecisions can be reduced and a track of the geographic position of a tracked animal can be determined.

In other implementations, matching magnetic field magnitude and direction information to longitude information can include determining additional magnetic field parameters such as the magnitude in spatial and/or temporal variations in magnetic field intensity and direction or the time or spatial rate of change in magnetic field intensity and direction. The determination such parameters can be based on known characteristics of the tracked animal. For example, if an animal is known to be inactive or dormant (and hence relatively immobile) at night, any changes in the magnetic field measurements during such periods can be compared to temporal variations in magnetic field due to, e.g., solar activity to increase the measurement accuracy and/or precision. As another example, if an animal is known to move at a relatively constant velocity, or if the animal's velocity can be determined from measurements (such as alignment information provided by an alignment sensor), rates of change in magnetic field intensity and direction can be used can be compared with maps, databases, or other information describing such changes the magnetic field.

In other implementations, matching magnetic field magnitude and direction information to longitude information can include comparing magnetic field information not only to the magnitude and direction of the earth's magnetic field, but also to known patterns of magnetic anomalies such as, e.g., mineral content, magnetized basalt, and the like.

Once the magnetic field magnitude and direction information is matched to longitude information, the system that performs process 1100 can output a collection of geographic locations and associated times at 1015.

Figure 12:
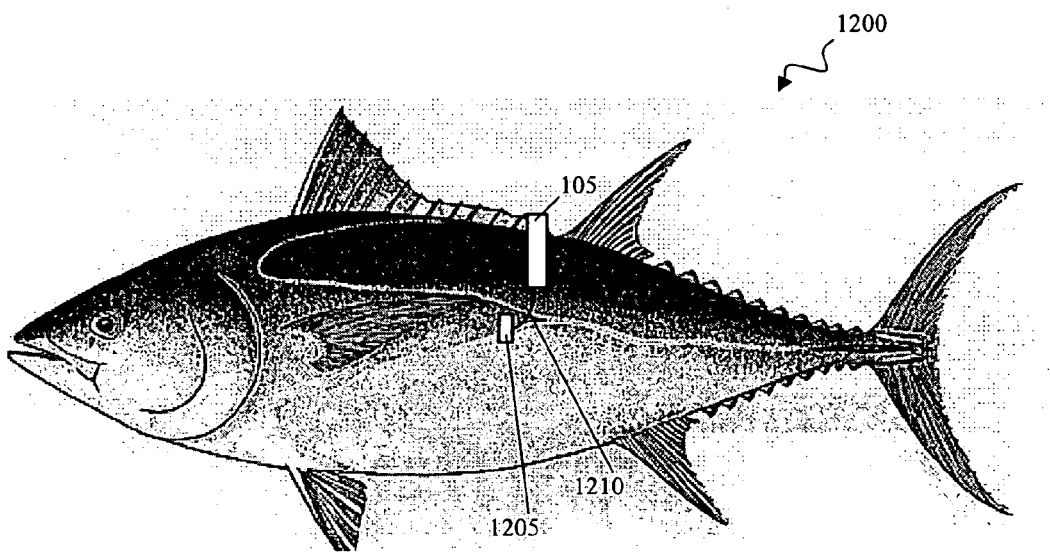
FIG. 12 illustrates a tracking device externally affixed to a fish.

FIG. 12 illustrates the tracking of an animal, namely, a tuna fish 1200. A tracking device, such as one of devices 100 (FIG. 1), 600 (FIG. 6), 700 (FIG. 7), is attached to tuna 1200 using an attachment member 1205 and a connector 1210, with environmental enclosure 105 remaining exposed to the ocean. Attachment member 1205 can be, e.g., barbed dart, an adhesive, a hook, a surgical suture, or other member that can remain attached to tuna 1200. Connector 1210 mechanically joins the tracking device to attachment member 1205 so that the tracking device also remains attached to tuna 1200. The illustrated connector 1210 is shown as a flexible, elongate member such as monofilament line, braided wire, braided Kevlar, braided Dacron, or single strand wire, although other types of connectors are possible. Connector 1210 can be detachable in that connector 1210 can allow the tracking device to be released from attachment member 1205. Such detachment can be automatic and occur without human intervention (e.g., after a certain period of time or when a certain geographic position is reached). Alternatively, the detachment can require a mechanical or other stimulus to release the tracking device from attachment member 1205.

Please note that tracking fish such as tuna 1210 is particularly difficult given that the ocean is a volume conductor. In particular, the propagation of electromagnetic signals, such as global positioning system (GPS) signals, through the ocean is hindered or even prevented altogether.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of implementations have been described. Nevertheless, it will be understood that various modifications may be made. For example, a tracking device can be associated with an animal in a variety of ways. For example, a tracking device can be attached directly to an animal (e.g., using adhesives, screws, clamps, rings, and the like), surgically implanted, or attached to another item or member carried by or otherwise transported with an animal during geographic scale movement. Accordingly, other implementations are within the scope of the following claims.

What is claimed is:

1. A method comprising:
   receiving timed magnetic field inclination information descriptive of inclination of a magnetic field to which a magnetometer was subject, the magnetic field inclination information having been collected while the magnetometer was associated with an animal;
   receiving timed longitude information descriptive of a longitude position of the animal, the longitude information comprising information descriptive of the illumination of the animal and having been collected while the magnetometer was associated with the animal; and
   matching the longitude information that is relevant to a first time to the magnetic field inclination information that is relevant to the first time to determine a geographic location of the animal at the first time.

2. The method of claim 1, further comprising:
   associating a tracking device that includes the magnetometer with the animal.

3. The method of claim 1, wherein receiving the timed magnetic field inclination information comprises:
  receiving alignment information descriptive of an alignment of the magnetometer, the alignment information having been collected while the magnetometer was associated with the animal; and
  correcting magnetic field information to account for the alignment of the magnetometer using the alignment information.

4. The method of claim 1, wherein:
  receiving the magnetic field inclination information comprises receiving information descriptive of a direction of the magnetic field from a magnetometer that maintains a known relationship with gravity; and
  matching the longitude information to the magnetic field inclination information comprises comparing the information descriptive of the direction of the magnetic field with information describing an inclination of the earth's magnetic field.

5. The method of claim 1, further comprising:
  receiving information descriptive of a magnitude of the magnetic field; and
  comparing the information descriptive of the magnitude of the magnetic field with information describing a magnitude of the earth's magnetic field.

6. The method of claim 1, wherein receiving the magnetic field inclination information and the longitude information comprises receiving data directly from the data output of a tracking device.

7. The method of claim 1, further comprising:
  receiving the determined geographic location from the data output of a tracking device.

8. A tracking device comprising:
  a vector magnetometer to generate an output descriptive of direction of a magnetic field to which the tracking device is subject at a collection of different times;
  a longitude sensor to generate an output descriptive of a longitude position of the tracking device at the collection of different times, wherein the longitude sensor comprises a photodetector and is to generate the output descriptive of the longitude position based on illumination detected by the photodetector; and
  a data store to store one or more of a) the descriptions output by the vector magnetometer and the longitude sensor and b) a description of the geographic position of the tracking device,
  wherein the one or more of the description output by the vector magnetometer, the description output by the longitude sensor, and the description of the geographic position of the tracking device is timed so that a time to which the description is relevant can be determined,
  wherein at least some of the description output by the vector magnetometer and at least some of the description output by the longitude sensor are relevant to a same first time, and
  wherein the description of the geographic position can be determined based at least in part on the descriptions output by the vector magnetometer and the longitude sensor.

9. The tracking device of claim 8, further comprising:
  an environmental enclosure encasing the vector magnetometer, the longitude sensor, and the data store to form a mechanical barrier between the encased components and the outside environment.

10. The tracking device of claim 8, further comprising:
  an alignment sensor to generate an output descriptive of an alignment of the vector magnetometer relative to gravity.

11. The tracking device of claim 8, further comprising:
  an alignment member to align the vector magnetometer relative to gravity.

12. The tracking device of claim 8, wherein the vector magnetometer comprises an inclination compass.

13. The tracking device of claim 8, wherein the vector magnetometer comprises a collection of components that are sensitive to the magnetic field to which the tracking device is subject and are aligned in different directions relative to each another.

14. The tracking device of claim 8, wherein the vector magnetometer comprises a magneto-inductive sensor vector magnetometer.

15. The tracking device of claim 8, wherein the tracking device further comprises:
  a processor to determine a description of the geographic position based on the descriptions output by the vector magnetometer and the longitude sensor.

16. The tracking device of claim 8, further comprising:
  an attachment member to attach the tracking device to an animal.

17. A tracking device comprising:
  a first means for generating an output descriptive of inclination of a magnetic field to which the tracking device is subject at a collection of different times;
  a second means for generating an output descriptive of a longitude position of the tracking device at the collection of different times, wherein the second means comprises a means for detecting illumination and is to generate the output descriptive of the longitude position based on illumination detected by the photodetector; and
  a means for outputting from the tracking device one or more of a) information descriptive of the outputs descriptive of the inclination of the magnetic field and the longitude position and b) a description of the geographic position of the tracking device,
  wherein the description of the geographic position can be determined based at least in part on the outputs descriptive of the inclination of the magnetic field and the longitude position,
  wherein the one or more of the output descriptive of the inclination of the magnetic field, the output descriptive of the longitude position, and the description of the geographic position of the tracking device is timed, and
  wherein at least some of the output descriptive of the inclination of the magnetic field and at least some of the output descriptive of the longitude position are relevant to a same first time.

18. The tracking device of claim 17, wherein the first means comprises a means for sensing alignment relative to gravity.

19. The tracking device of claim 10, wherein the alignment sensor comprises:
  an accelerometer.

20. The tracking device of claim 10, wherein the alignment sensor is mounted in a fixed mechanical relationship with the vector magnetometer.

21. The tracking device of claim 10, wherein the tracking device further comprises:
  a processor to determine an inclination of the magnetic field based on the descriptions output by the vector magnetometer and the alignment sensor.

22. A tracking device comprising:

a magnetometer to generate an output descriptive of a magnetic field to which the tracking device is subject at a collection of different times;

an alignment sensor, the alignment sensor to generate an output descriptive of an alignment of the magnetometer relative to gravity a longitude sensor to generate an output descriptive of a longitude position of the tracking device at the collection of different times; and a data store to store one or more of a) the descriptions output by the magnetometer, the longitude sensor, and the alignment sensor, b) a description of direction of the magnetic field and the description output by the longitude sensor, and c) a description of the geographic position of the tracking device, wherein the one or more of the description output by the magnetometer, the description output by the longitude sensor, the description output by the alignment sensor, the description of the direction, and the description of the geographic position of the tracking device is timed so that a time to which the description is relevant can be determined, wherein at least some of the description output by the magnetometer, at least some of the description output by the longitude sensor, and at least some of the description output by the alignment sensor are relevant to a same first time, and wherein the description of the geographic position can be determined based at least in part on the descriptions output by the magnetometer, the longitude sensor, and the alignment sensor.

23. The tracking device of claim 22, wherein the alignment sensor comprises:

an accelerometer.

24. The tracking device of claim 23, wherein the accelerometer comprises a three-axis accelerometer.

25. The tracking device of claim 22, wherein:

the magnetometer comprises a vector magnetometer; and the alignment sensor is mounted in a known mechanical relationship with the vector magnetometer.

26. The tracking device of claim 22, wherein the tracking device further comprises:

a processor to determine the inclination of the magnetic field based on the descriptions output by the magnetometer and the alignment sensor.

* * * * *